United States Patent
Yang et al.

(10) Patent No.: US 6,429,259 B1
(45) Date of Patent: Aug. 6, 2002

(54) WATER SOLUBLE POLYMERIC COMPLEX COMPRISING A CONDUCTING POLYMER AND A BIOPOLYMER

(75) Inventors: Sze Cheng Yang, Wakefield, RI (US); Patrick McCarthy, Oakland, CA (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 09/825,074

(22) Filed: Apr. 3, 2001

Related U.S. Application Data

(60) Provisional application No. 60/194,297, filed on Apr. 3, 2000.

(51) Int. Cl.$^7$ .............................................. C08G 63/48
(52) U.S. Cl. .................. 525/54.1; 525/54.4; 525/54.42; 530/363; 530/364
(58) Field of Search ................................ 525/54.1, 54.4, 525/54.42; 530/363, 364

(56) References Cited

U.S. PATENT DOCUMENTS 5,053,225 A * 10/1991 Miyasaka et al. .......... 424/94.1
5,489,400 A    2/1996  Liu et al.

* cited by examiner

*Primary Examiner*—Samuel A. Acquah
(74) *Attorney, Agent, or Firm*—Samuels, Gauthier & Stevens, LLP

(57) ABSTRACT

A molecular complex which comprises a biopolymer having a plurality of ionic functional groups and a conductive polymer having charges therein. The charges bind to the ionic functional groups to form the complex. The conductive polymer is selected from the group consisting essentially of polyaniline, polypyrrole, polythiophene, poly(phenylenevinylene) or poly(phenylene sulfide) and substituted versions thereof.

16 Claims, No Drawings

WATER SOLUBLE POLYMERIC COMPLEX COMPRISING A CONDUCTING POLYMER AND A BIOPOLYMER

This appln. claims benefit of Prov. No. 60/194,297 filed Apr. 3, 2000.

BACKGROUND OF THE INVENTION

1. Field of the Invention

Double-stranded molecular complexes.

2. Description of the Relevant Art

The formation of polymeric complexes where two different synthetic polymers are in side-by-side, intimate, contact is difficult. There are only a few examples where two polymers can be blended to form an intimate polymeric complex. A possible reason for this difficulty is the great entropy barrier that exists for two different polymers' side-by-side intimate contact. This kind of entropy barrier is referred to as entropic frustration.

The object of a template-guided synthesis, see U.S. Pat. No. 5,489,400, is to reduce this entropy barrier by attaching monomers to the backbone of a polymer. The polymer acts as a template to arrange the monomers before they are polymerized. After polymerization very little rearrangement is necessary for the two polymer strands to form an intimate polymeric complex. The entropic frustration is released as the polymerization proceeds.

The template-guided synthesis is carried out in a series of steps. In step one, the monomers are attached to the backbone of a polymeric template to form an adduct. In step two, the adduct is acidified to form a precursor adduct. The addition of acid in this step controls the solubility of the template-guided synthesis product. In step three, the polymerization is initiated.

BRIEF SUMMARY OF THE INVENTION

The present invention is a molecular complex comprising a conducting polymer and a biopolymer. The conducting polymer (CP) is selected from the group consisting of polyaniline, polypyrrole, polythiophene, poly(phenylenevinylene) or poly(phenylene sulfide) and substituted versions thereof. The biopolymer is selected from the group consisting essentially of proteins and nucleic acids including polynucleotides, e.g. DNA or RNA, polysacharrides, carbohydrates, etc. The invention comprises both the molecular complexes and the method of synthesizing the complexes. A particularly preferred embodiment comprises molecular complexes of polypyrrole and bovine serum albumin, polyaniline and bovine serum albumin, polypyrrole and human serum albumin and polyaniline and human serum albumin.

The molecular complexes can be usefully employed in anti-static coatings on films, e.g. photographs and as an antioxidant, e.g. to be carried by the bloodstream.

DESCRIPTION OF THE PREFERRED EMBODIMENT(s)

A biopolymer such as albumin is used as a template for the attachment of monomers. Once the monomers are added to albumin in solution, they attach or absorb onto the albumin to form a non-covalent intermolecular assembly, an adduct. The driving forces for adduct formation are thought to be electrostatic, hydrogen bonding and/or van der Waals forces.

The adduct is defined by the following symbol: $(Py)_x$:BSA, $(An)_x$:BSA, $(Py)_x$HSA or $(An)_x$HSA, where $(Py)_x$=X pyrrole monomers, $(An)_x$=X aniline monomers and represents a number of monomers bound non-covalently to the albumin, BSA=bovine serum albumin and HSA=human serum albumin.

In step two, the adduct is acidified to prepare the adduct for the subsequent polymerization reaction. A controlled amount of acid added in step two is helpful for the formation of stable water-dispersion of the reaction product in the subsequent step (step 3, the polymerization step). It is theorized that the additional acid causes an alteration of the degree of ionization of the anionic functional groups (e.g. the carboxylic acid groups) of the adduct and thus changes the conformation of the adduct. An adduct with intermediate degree of ionization results in stable dispersion without the formation of precipitation product. Although the polymerization of pyrrole can be achieved in a relatively wide range of pH (pH 0 to 7), the solution needs to be more acidic than pH 3 for the formation of green polyaniline product. In a solution with pH>3, the polymerization reaction of aniline results in a brown product which is a mixture of polyaniline with a substantial amount of impurities.

In step three, the adsorbed pyrrole or aniline monomers in the adduct (for example, $(Py)_x$:BSA, $(An)_x$:BSA, $(Py)_x$:HSA or $(An)_x$:HAS) is polymerized to form the complex between the conducting polymer and the biopolymer. The polymerization reaction is induced by the addition of oxidants such as sodium persulfate, or ferric ions and hydrogen peroxide.

EXAMPLE I

Synthesis of an interpolymer complex containing polypyrrole and bovine serum albumin.

Dilute 1.0 grams bovine serum albumin (66,000 MW, Sigma (Fraction 5 Cohn)) to 10 mls with distilled water. Add 0.070 ml pyrrole and stir the solution for 24 hours. Dilute this solution to 20 ml with distilled water and stir for 5 minutes. Add 10 ml of 0.6 M HCl dropwise and slowly. Stir for 15 minutes. Add 10 ml of 0.1 M sodium persulfate dropwise and stir overnight. The final dark green solution contained no visual particles or precipitates.

EXAMPLE II

Synthesis of an interpolymer complex containing polyaniline and bovine serum albumin.

Dilute 1.0 grams bovine serum albumin (66,000 MW, Sigma (Fraction 5 Cohn)) to 10 mls with distilled water. Add 0.090 ml aniline and stir the solution for 24 hours. Dilute this solution to 20 ml with distilled water and stir for 5 minutes. Add 10 ml of 0.6 M HCl dropwise and slowly. Stir for 15 minutes. Add 10 ml of 0.1 M sodium persulfate dropwise and stir overnight. The final dark green solution contained no visual particles or precipitates.

EXAMPLE III

Synthesis of an interpolymer complex containing polypyrrole and human serum albumin.

Dilute 0.030 gram human serum albumin (Aldrich, A-3782, 99% by argrose electrophoresis) to 0.30 mls with de-ionized water. Add 1.0 ml pyrrole to 9.0 ml de-ionized water. Shake this solution vigorously until the pyrrole is homogenously dispersed. Add 0.021 ml of this pyrrole dispersion to the human serum albumin solution. Stir the solution for 24 hours. Add 0.30 ml of 0.6 M HCl dropwise and slowly. Stir for 15 minutes. Add 0.3 ml of 0.1 M sodium persulfate dropwise and stir overnight. The final dark green solution contained no visual particles or precipitates.

EXAMPLE IV

Synthesis of an interpolymer complex containing polyaniline and human serum albumin.

Dilute 0.030 gram human serum albumin (Aldrich, A-3782, 99% by argrose electrophoresis) to 0.30 mls with de-ionized water. Add 1.0 ml aniline to 9.0 ml de-ionized water. Shake this solution vigorously until the aniline is homogenously dispersed. Add 0.021 ml of this aniline dispersion to the human serum albumin solution. Stir the solution for 24 hours. Add 0.30 ml of 0.6 M HCl dropwise and slowly. Stir for 15 minutes. Add 0.3 ml of 0.1 M sodium persulfate dropwise and stir overnight. The final dark green solution contained no visual particles or precipitates.

The physical properties of molecular complexes Examples I–IV described above were compared with the reaction products from a single-strand synthesis of the conductive polymer

Single Strand Polypyrrole and Polyaniline Synthesis

Single strand polypyrrole and polyaniline were synthesized separately using the same procedure that was used for the polymeric complex synthesis (except the albumin was excluded from the synthesis). Single strand conducting polymer was synthesized by diluting 0.070 mls pyrrole or 0.090 mls aniline to 10 ml with distilled water. The dilute polyrrole solution was stirred for 24 hours. The solution was diluted to 20 mls with distilled water. The solution was acidified by adding 10 mls 0.6 M HCl dropwise and slowly. The solution was allowed to stir for 15 minutes. The monomers are polymerized to their respective conducting polymers by the addition of 10 mls 0.1 M sodium persulfate. The mixture was allowed to react overnight.

The physical properties of the single strand polypyrrole and the single strand polyaniline precipitate out immediately to form an intractable solid. The polymeric complexes PPy:BSA, Ppy:HSA and PAN:BSA and PAN:HSA were soluble in water for over six months. The reaction products are true solutions, that is, they can be dried as a powder and resuspended in water.

Also, the PAN:BSA complex stabilizes the conductive form of the polyaniline to pH induced conductor-to-insulator transition. Single stand polyaniline undergoes the pH induced conductor-to-insulator transition when the pH is increased above pH 6. The interpolymer complex undergoes the transition when the pH is increased above pH 8.

The difference in physical properties between the single strand conducting polymers and the template-guided synthesis products support the formation of intimate polymeric complexes.

The molecular complexes were purified by dialysis and characterized.

UV-Vis Spectra

The UV-Vis spectra was taken of the PPy:BSA complex and the PAN:BSA complex diluted in distilled water. The UV-VIS spectra are consistent with the UV-Vis spectra of the respective single strand conducting polymer UV-Vis spectra reported in the literature. For the PPy:BSA complex spectrum, two absorption bands are observed at 440 nm and 940 nm. For the PAN:BSA complex spectrum.

Infra-Red Spectra

The IR spectra was taken of both the PPy:BSA complex and the PAN:BSA complex. The UV-Vis spectra of the both polymeric complexes show bands characteristic of polypyrrole or polyaniline and albumin.

The structure of a CP:BSA complex product is not expected to have a side-by-side arrangement of the conducting polymer with the albumin. The primary, secondary, and tertiary structure of albumin are well defined. The physical properties of the reaction products show that the formed conductive polymer interacts intimately with the albumin. How and how ordered the interaction is, is only speculative.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A molecular complex which comprises:
   a biopolymer, having a plurality of ionic functional groups; and
   a conductive polymer having charges therein which bind to the ionic functional groups to form the complex.
2. The complex of claim 1 wherein:
   the biopolymer is selected from the group consisting essentially of proteins and nucleic acids.
3. The complex of claim 1 wherein:
   the proteins comprise albumins.
4. The complex of claim 3 wherein:
   the albumins are selected from the groups consisting essentially of bovine serum albumin or human serum albumin.
5. The complex of claim 1 or 4 wherein:
   the conductive polymer is selected from the group consisting of polyaniline, polypyrrole, polythiophene, poly (phenylenevinylene), poly(phenylene sulfide) and substituted versions thereof.
6. The complex of claim 5 wherein:
   the conductive polymer is either polyaniline or polypyrrole.
7. A method for the formation of a molecular complex:
   adding a conductive monomer to a biopolymer to form an adduct; the monomer attaching to the biopolymer
   polymerizing the monomer to form a conductive polymer the biopolymer and conductive polymer forming the molecular complex.
8. The method of claim 7 wherein:
   the monomer and biopolymer form a non-covalent adduct.
9. The method of claim 8 which comprises:
   acidifying the adduct.
10. The method of claim 9 which comprises:
    acidifying the adduct prior to polymerizing the adduct.
11. The method of claim 7 wherein:
    the molecular complex is a solution.
12. The method of claim 7 wherein:
    the biopolymer is selected from the group consisting of proteins and nucleic acids.
13. The method of claim 7 wherein:
    the proteins comprise albumins.
14. The method of claim 13 wherein:
    the albumins are selected from the groups consisting of bovine serum albumin and human serum albumin.
15. The methods of claim 7 or 14 wherein:
    the conductive polymer is selected from the group consisting of polyaniline, polypyrrole, polythiophene, poly (phenylenevinylene), poly(phenylene sulfide) and substituted versions thereof.
16. The method of claim 15 wherein:
    the conductive polymer is either polyaniline or polypyrrole.

* * * * *